March 14, 1944.   J. W. ROWELL   2,343,931
MECHANICAL SCANNING DEVICE FOR TELEVISION AND REMOTE CONTROL
Filed Aug. 2, 1940   8 Sheets-Sheet 1

Joseph William Rowell INVENTOR.

March 14, 1944. J. W. ROWELL 2,343,931
MECHANICAL SCANNING DEVICE FOR TELEVISION AND REMOTE CONTROL
Filed Aug. 2, 1940 8 Sheets-Sheet 2

Joseph William Rowell INVENTOR.

March 14, 1944. J. W. ROWELL 2,343,931
MECHANICAL SCANNING DEVICE FOR TELEVISION AND REMOTE CONTROL
Filed Aug. 2, 1940 8 Sheets-Sheet 3

FIG. 5

Joseph William Rowell INVENTOR.

March 14, 1944.    J. W. ROWELL    2,343,931
MECHANICAL SCANNING DEVICE FOR TELEVISION AND REMOTE CONTROL
Filed Aug. 2, 1940    8 Sheets-Sheet 4

Joseph William Rowell  INVENTOR.

March 14, 1944. J. W. ROWELL 2,343,931
MECHANICAL SCANNING DEVICE FOR TELEVISION AND REMOTE CONTROL
Filed Aug. 2, 1940 8 Sheets-Sheet 5

Inventor:
JOSEPH WILLIAM ROWELL
By Calvin Brown, Attorney

Inventor:
Joseph William Rowell
By [signature] Attorney

March 14, 1944.  J. W. ROWELL  2,343,931
MECHANICAL SCANNING DEVICE FOR TELEVISION AND REMOTE CONTROL
Filed Aug. 2, 1940  8 Sheets-Sheet 7

Inventor:
JOSEPH WILLIAM ROWELL
By Calvin Brown,
Attorney

Patented Mar. 14, 1944

2,343,931

UNITED STATES PATENT OFFICE 2,343,931

MECHANICAL SCANNING DEVICE FOR TELEVISION AND REMOTE CONTROL

Joseph William Rowell, Los Angeles, Calif., assignor of one-fourth to Edna Schley Leonardson and one-fourth to Daniel Leonardson, both of Los Angeles, Calif.

Application August 2, 1940, Serial No. 349,944

4 Claims. (Cl. 178—7.6)

The invention relates to improvements on previous systems of scanning, wherein a single perforated disc or a perforated drum has been used, these methods having always resulted in a wiping effect in the reproduction, destructive to its clarity.

To obviate this wiping effect, and to secure improved definition in the detail of the received reproduction of the image, I have devised a pair of oppositely revolving and partially overlapping, opaque and specially perforated discs, the perforations in each disc of each pair of discs being so relatively located that at no instant may more than one unit beam of light pass thru the pair of discs, and in any single revolution of the pair of discs, a sufficient number of similar sized unit beams of light shall pass thru the pair of discs to equal in their combined areas the whole area of the picture or image scanned.

The invention is designed to scan standard 35 millimeter motion picture film and the diameter of the scanning perforations shown are deemed suitable for that purpose, but finer or coarser perforations may be used, the definition of the picture received being greater as the diameter of unit perforations decreases.

The same method may be used in scanning for direct television and for facsimile transmission and reproduction, and the double discs may be adapted for use in generating grouped electric frequencies of selectively varied characteristics for use in remote control of mechanical apparatus.

The form of the invention is illustrated in the accompanying drawings, in which

Figure 1:
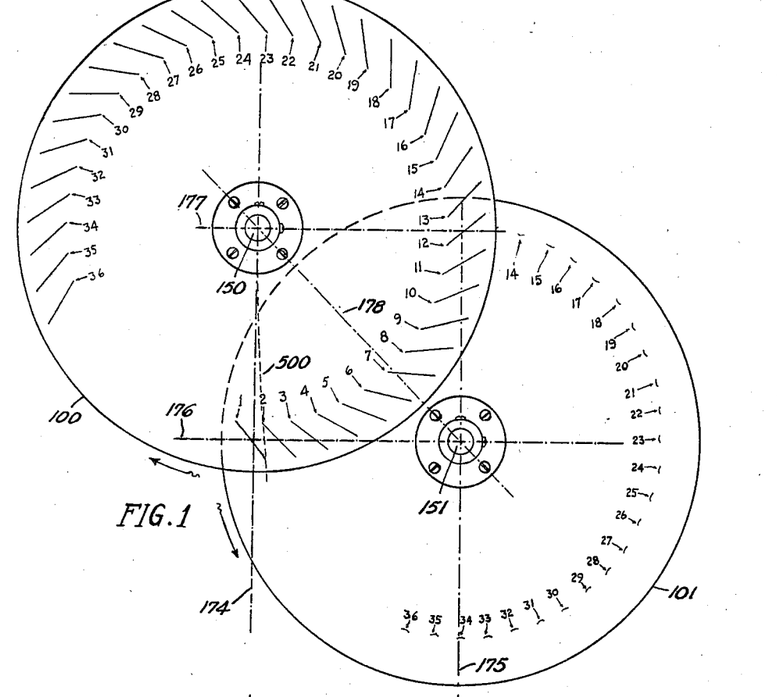
Figure 1 is an elevation of a pair of scanning discs which may be utilized in the practice of the invention.

Figure 1 is an elevation of a pair of oppositely revolving and partially overlapping, opaque and specially perforated discs, drawn one half full size and marked 100 and 101, and depicted as they should be mounted on shafts 150 and 151 respectively, for operating revolution in the directions indicated by arrows, such motion producing a conjunction of single individual perforations in each disc in such sequential and progressive alignment that each revolution shall result in the passage of a light beam from an activating light source thru the conjunctive perforations of the pair of discs, and thence thru a photo film on to the cathode plate of a photoelectric cell a multiplicity of times in consecutive flashes the said combined flashes covering the entire area of the film or subject scanned, the aforesaid procedure and arrangement of perforations being designed as hereinafter fully described and to secure the following results:

(1) Each instantaneous and individual flash of light thru the perforations in a pair of discs and thence on thru an image on a photo film to register upon the cathode plate of a photo-electric cell which possesses the property of generating electrical impulses or frequencies which may be amplified and transmitted instantaneously over a wired circuit or by known radio methods, shall produce an electrical frequency of an intensity depending upon the degree of transparency of the unit area of film scanned by such individual beam.

(2) The pair of discs shall be so mounted on their shafts as to be capable of opposite revolutions in the directions shown, at a rate of speed corresponding to the speed adopted for the operation of motion picture film used in the projection of pictures on a screen, which is 24 picture frames per second.

(3) Each revolution of the pair of discs shall result in the complete scanning of one frame of a motion picture film while it is momentarily quiescent in its intermittent movement of 24 picture frames per second past the central axis of the stationary viewing frame. To that end the pair of discs, both for transmission and receiving must be mounted on motivating apparatus capable of revolving them at the rate of 24 revolutions per second.

(4) It being a fact that the size of an individual or unit perforation determines the definition or quality of the frequencies and hence of the picture received, the smaller the perforation the finer the definition will result, and since it was convenient to use perforations 1/48 of an inch in diameter, that size was adopted by me in constructing the experimental discs, but still smaller perforations may be used in the application of the principle, as hereinafter described under headings of Figures 15 and 16.

(5) While it is feasible to so arrange the perforations of the discs as to make the scanning lines of holes cross the scanned area in any direction, since the operation of conjunction of a pair of holes is that of relativity, I have adopted for the discs shown in drawings herewith a system of scanning from top to bottom in thirty six vertical lines within three quarters of an inch width, the succession of such lines being from left to right as viewed on Figure 1, of the drawings. To fulfill this requirement, I have devised a system of diagonal lines of circular perforations marked 1 to 36 inclusive, on primary disc 100 of Figure 1. The locations of the conjunctive unit perforations as shown on secondary disc 101 on Figure 1 were obtained by punching thru the previously punched perforations of primary disc 100 and on thru secondary disc 101 in a consecutive vertically downward direction along the vertical lines, 1 to 36 inclusive, as shown on Figure 4, using each successive diagonal line as revolution of the geared discs brings each diagonal line of perforations into position, this operation being set forth in detail on Figures 6, 7, 8, 9, 10, and 11 in the drawings herewith.

Figure 2:
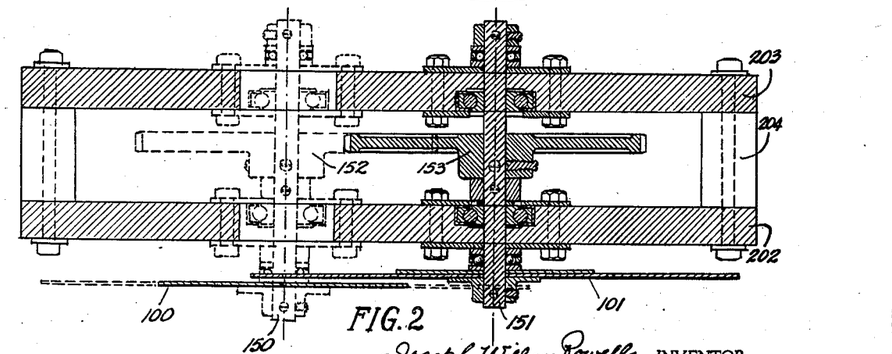
Figure 2 is a transverse sectional view of means for rotating the scanning discs of Figure 1 in opposite directions.

Figure 1 shows a pair of above mentioned discs and their center lines of shafting 150 and 151, but not the motivating gear assembly, which latter has been indicated in a plan of a suitable assembly marked Figure 2, this chassis design not being a part of my claims to originality of conception, being only incidental.

The outside diameter of both discs 100 and 101 on Figure 1 and Figure 2 is 9⅞ inches and the juxtaposition of the discs when mounted is such that the vertical center lines 174 and 175 of the two shafts are $4^{24}/_{100}$ inches apart and the horizontal center lines 176 and 177 of same shafts are the same distance apart, which means that the distance between the centers of said shafts along the hypotenuse line 178 must be six inches. These dimensions facilitate the use of two six inch pitch diameter gears, keyed to shafts 150 and 151, on which are also keyed the discs 100 and 101, thus insuring a similar but opposite movement on each disc, producing a maintained relativity between each disc of the pair.

Figure 3:
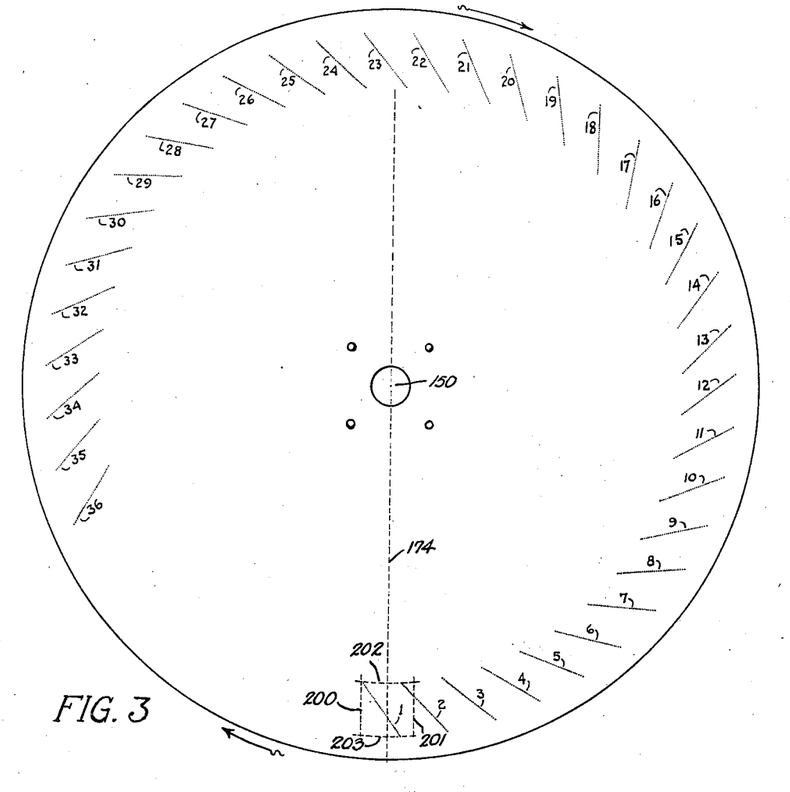
Figure 3 is an enlarged plan view of one of the scanning discs shown in Figure 1.
Figure 4:
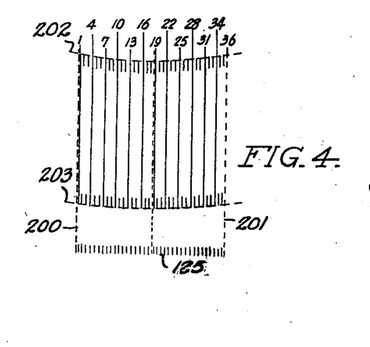
Figure 4 is illustrative of the resolution of a field of view when utilizing the scanning discs of Figure 1.

The intersection of lines 174 and 176 represents the center of the imaginary frame within which the total scanning area exists, which in this instance is ¾ of an inch square, this frame being shown full size on Figure 4, and the commencement of scanning occurs when the top perforation on diagonal line 1 of Figure 3 is at the top of the first vertical scanning line adjoining the left hand side of the imaginary frame shown on Figure 4. The detailed order in which scanning of a single frame area by 1296 successive unit areas of light is caused to occur by one revolution of the disc, will be described later under heading of Figures 5, 6, 7, 8, 9, 10, 11, and 12.

*Figure 2.*—Figure 2 represents a plan view taken on the horizontal level of line 176 of Figure 1, and shows the plan of a suitable chassis 202, 203 and 204, upon which is mounted the pair of discs 100 and 101, with their shafts 150 and 151, and the meshed gears 152 and 153, all of which shows the assembly used by me in the experimental apparatus with which I have demonstrated the correctness of my scanning system. In the experimental apparatus, gear 153 of six inch pitch diameter was meshed with a gear of $4\frac{8}{10}$ inches pitch diameter on the drive shaft of a motor whose speed was 1800 revolutions per minute, with the result that the pair of discs revolved at the rate of 1440 revolutions per minute, giving the desired speed, 24 revolutions per second.

*Figure 3.*—In Figure 3 the same primary disc as is marked 100 by Figure 1 is again shown singly to a scale of three quarters full size, with the vertical center line 204 passing thru the center line of its shaft center 150 and thru the center of the imaginary stationary picture frame location which is indicated as enclosed by dotted lines marked 200, 201, 202 and 203 on Figure 3. The thirty six diagonal lines of perforations or transparent spots marked 1 to 36 inclusive, are marked in the order in which the clockwise revolution of the disc causes each diagonal line of perforations or transparent spots to traverse its complementary vertical light scanning strip on the imaginary stationary picture frame area within the lines 200, 201, 202 and 203.

*Figure 4.*—Figure 4 illustrates at a full size scale, the same imaginary picture area as is shown above it on Figure 3, said area being enclosed within the lines marked 200, 201, 202 and 203 in both cases. In this full sized area has been shown 12 sequences of the center lines of vertical light scanning strips marked 1, 4, 7, 10, 13, 16, 19, 22, 25, 28, 31, 34, and 36, each of these numbered lines being within and on the vertical center of thirty six scanning strips (every fourth of which is numbered), whose aggregate areas cover the entire surface of the picture scanned. Each of these numbered lines represents the number of vertical light scanning strips preceding it, added to itself. The manner and order in which these vertical strips are scanned, is as follows:

The first vertical line of holes scanned is marked 1, and is scanned from top to bottom by a spot of light passing at consecutive conjunctions of perforations through the pair of discs and the scanning of succeeding vertical light spaces is described in detail hereinafter in the specification of Figures 5, 6, 7, 8, 9, 10, and 11.

Figure 5:
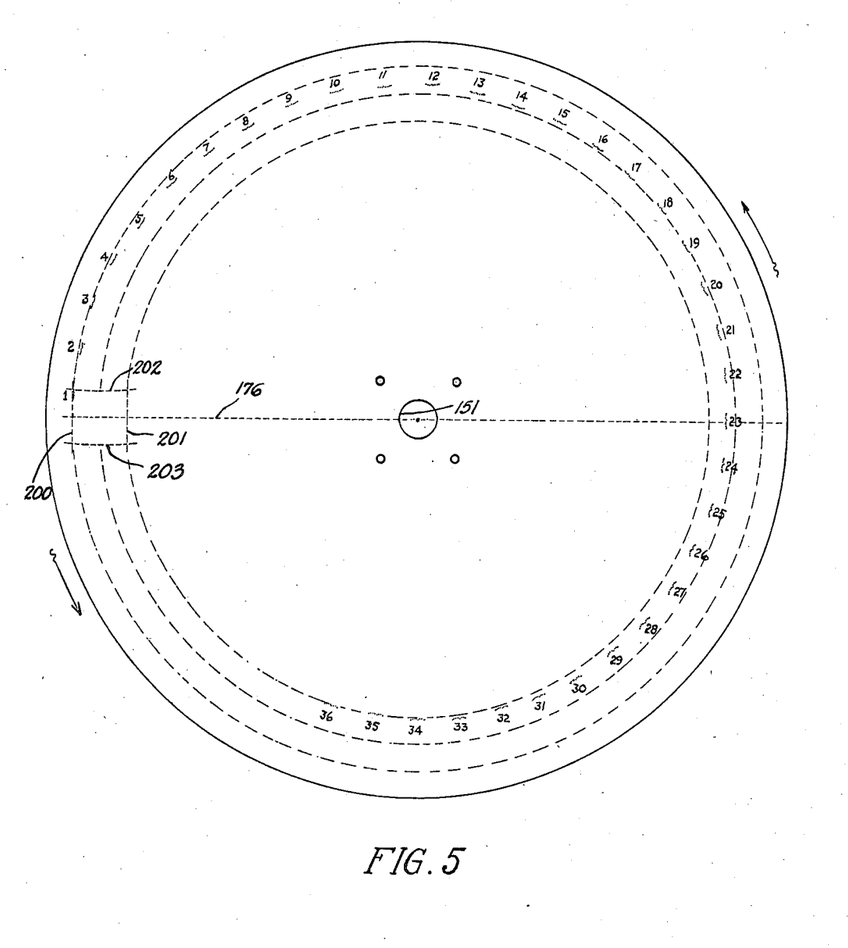
Figure 5 is a plan view on an enlarged scale of one of the scanning discs of Figure 1, with the field of view shown in dotted lines, together with the area of said field of view traversed upon rotation of said disc.

*Figure 5.*—The same secondary scanning disc as is marked 101 in Figure 1, is again shown singly to a scale three quarters full size in Figure 5, for the purpose of showing all thirty six lines of perforations, all of which do not appear on disc 101 of Figure 1, because of the overlapping of disc 100. The thirty six lines of perforations marked 1 to 36, inclusive, on the secondary disc shown on Figure 5, are complementary to the thirty six similarly marked diagonal lines of perforations on primary disc shown on Figure 3, and have been located by using the chassis shown on Figure 2, as a jig with the two shafts and gears in mesh. Then, placing a blank disc on shaft 151 of Figure 1, and partially overlapping the blank disc with the previously punched primary disc 100, and securing the set screws on the shafts, the set up is nearly ready for the punching of the secondary disc. It remains to set up a fixed horizontal scale marked for thirty six light strips to three quarters of an inch in horizontal length and set it so that it becomes a marking scale of center lines of light strips along the bottom of the imaginary picture frame. Then a micrometer controlled vertical guide strip of brass is adjusted so that it may be used as a guide to punch the first or left hand vertical line of holes in the imaginary frame by means of advancing the second hole on diagonal line 1 of Figure 4, to the first vertical strip after punching the first hole thru the secondary disc, and so continuing to advance each separate hole on diagonal line 1 to the first vertical strip until the thirty six holes of the first vertical line have been punched thru both discs, finishing the first vertical light scanning strip of the imaginary picture frame.

Then, the first vertical strip having been punched thru the pair of discs, the micrometer guide line is advanced to the right 2/48 of an inch and the top hole on diagonal line 2 aligned with the third vertical light strip and the same operation performed on light strip 3 as was previously done on light strip 1, namely 36 perforations. Then the micrometer guide line is screwed back to the left side of vertical light strip 2, and the top hole on diagonal line 3 is aligned with the center line of the second vertical light strip and the same operation performed on light strip 2 as was done on light strip 3. Then the micrometer guide line is advanced to the right 2/48 of an inch, and the top hole on diagonal line 4 aligned with the center line of the fourth vertical light strip, thus beginning a new sequence of three light lines to each sequence of punching. There are twelve of these punching sequences across the imaginary frame of the picture, from left to right, and each sequence is made up of three vertical lines of holes, but they do not follow one after the other in their order of scanning, but do scan in a staggered order, thus:

| | |
|---|---|
| First light strip is scanned by diagonal line 1 | |
| Third light strip is scanned by diagonal line 2 | Sequence One. |
| Second light strip is scanned by diagonal line 3 | |
| Fourth light strip is scanned by diagonal line 4 | |
| Sixth light strip is scanned by diagonal line 5 | Sequence Two. |
| Fifth light strip is scanned by diagonal line 6 | |
| Seventh light strip is scanned by diagonal line 7 | Sequence Three Begins. | and so on identically for twelve sequences totaling thirty six light strips.

The object in so scanning in staggered order is to obviate flicker in the received picture, being analogous to interlacing in the cathode tube system of television, although it is here noted that the scanning operation may be successfully performed, if the punching operation, thru primary into secondary disc, be done in a regular, as distinguished from a staggered succession, either way being optional as long as the method selected is used in both transmission and reception pairs of discs.

I will here state that I have punched a set of discs on number 27 gauge sheet copper and another set on stiff plastic black Radite 1/16 of an inch thick, but for commercial purposes I intend to use these punched discs as master discs from which to print by photographic means on to sensitized transparent discs of glass or suitable transparent material leaving each such disc a negative photographic plate with opaque field with clear transparent spots where the perforations exists in the punched master disc, thus attaining both accuracy and economy of quantity production.

Having described the method of locating the perforations or holes in the secondary disc, Figure 5, thru the moving of successive holes in primary disc up to corresponding vertical imaginary light strips of same width as diameter of holes and using these successive holes when so aligned, as guides thru which to punch the complementary holes in secondary disc 101, the detailed analysis of the light strips which aggregate the entire area scanned will hereinafter be stated under the following headings, Figures 6, 7, 8, 9, 10, and 11.

On Figure 5, the line 176 is the same horizontal line as is marked 176 on Figure 1, and lines 200 to 203, inclusive, enclose the imaginary picture frame, and two dotted lines indicate the circular track of lines of perforations marked 1 and 36, the third dotted line passing through the center of the imaginary frame as the disc revolves.

Figure 6:
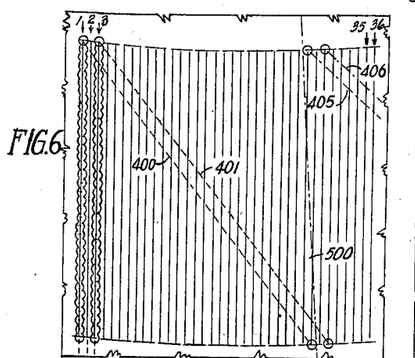
Figure 6 is an enlarged detail of a field of view divided into light paths and illustrative of movement of the light paths when a light beam is properly utilized in conjunction with the scanning discs illustrated in Figure 1, Figure 7 graphically illustrates the light path movement of Figure 6.

*Figure 6.*—For purposes of a more detailed explanation of the process of perforating the secondary disc Figure 5, the entire scanned area of picture frame is depicted at four times the actual size of the picture frame as used for motion picture film, being graphically shown in Figure 6, wherein thirty-six vertical lines represent the centers of parallel light scanning strips each one forty-eighth of an inch wide and three quarters of an inch long from top to bottom, the aggregate areas of the light strips equalling the total area of the picture frame or three quarters of an inch square. Hence, the scale of Figure 6, as well as Figures 7 to 11 inclusive, is four times full size.

In Figure 6, the diagonal line of holes 1 of Figures 1 and 3 is here marked 400, and has been shown in the position it occupies when beginning to scan the first vertical light strip, said strip being shown as formed on the imaginary frame area when the secondary disc 101 is being punched. The arrow shows the direction of revolution of primary disc 100 and 404 shows the periphery of same disc, while 405 shows position of diagonal line of holes 2 of Figures 1 and 3, when the diagonal line of holes 1 starts to scan the first vertical light strip, and 500 shows a clearance line radiating from the center of primary disc 100, the intersection of which line with the periphery of the top line of the picture frame determines the distance apart for spacing the top holes of the diagonal lines of holes along the last mentioned periphery.

The bottom hole on diagonal line 1, here marked 400, and the top hole of diagonal line 2, here marked 405, must have their peripheries separated by the clearance line. See also Figure 1. The line marked 406 indicates position of diagonal line of holes 3, of Figures 3 and 5, when the diagonal line of holes 2, here marked 14, starts to scan the third vertical light strip.

To continue, on Figure 6, 1 and 3 indicate those two vertical light strips as already scanned with the second vertical light strip still to be scanned.

Figure 7:
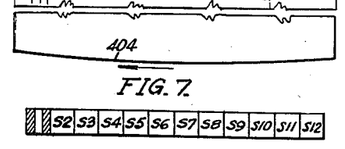

*Figure 7.*—This figure shows a graphic scale of sequences, divided into twelve equal parts, each part of which is composed of three vertical light strips, said strips being located vertically under their position on the imaginary picture frame. On this graphic scale the vertical light strips 1 and 3 are also shown cross-hatched to indicate they have been already scanned, while vertical light strip 2, as well as sequences S2, to S12, inclusive, are shown as not yet scanned.

Figure 8:
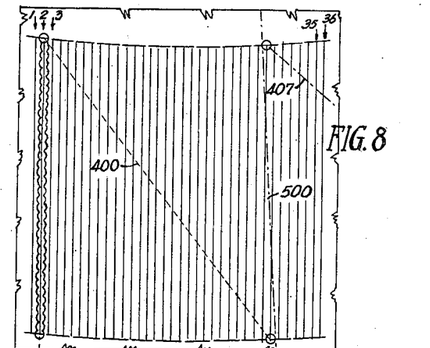
Figure 8 is a plan of the field of view and illustrative of a light path resultant upon rotation of the scanning discs of Figure 1.

*Figure 8.*—The Figure 8 shows the same imaginary picture frame as does Figure 6, with the center lines of thirty six vertical light spaces the only one of which shown as scanned by diagonal line 3 (here marked 402), is 2, it being understood that 1, and 3, are already scanned.

Thus 1, 2, and 3 have been scanned and complete a sequence, or one twelfth of the entire picture frame area.

Line 407 shows the position of diagonal line of holes 4 of Figure 3, when the diagonal line of holes 3 on Figure 3, here marked 15, starts to scan the vertical light strip 2. The clearance line is marked 500.

Figure 9:
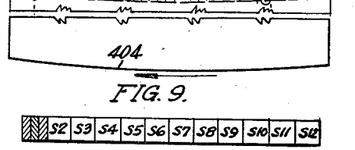
Figure 9 is a graphic scale of the light sequences of Figure 8.

*Figure 9.*—The Figure 9 shows the graphic scale of sequences, showing three vertical light strips completing one sequence as having been scanned, the last light strip being scanned being double cross-hatched.

Figure 10:
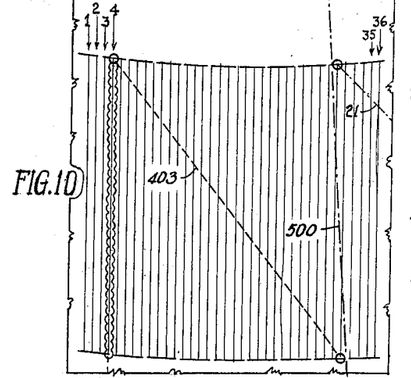
Figure 10 is a plan of the field of view showing a further light sequence.

Figure 10 represents the same imaginary picture frame as does Figures 6 and 8, but does not make note of the three vertical light strips forming the sequence already scanned, but shows the position of the diagonal line of holes 4 of Figures 1 and 3, here marked 403, when the top hole thereof starts to scan the fourth vertical light strip, which is the first strip of three forming a second sequence S2. The preferable order of scanning each of the twelve sequences is the same, namely, a staggered order, as has been already stated under heading of Figure 5, which described the manner in which the secondary disc was punched thru the perforations in the primary disc. The position of diagonal line of holes 5 on Figure 3, when the diagonal line of holes 4 on Figure 3, starts to scan the vertical light strip 4 is marked 408. The clearance line is marked 500.

Figure 11:
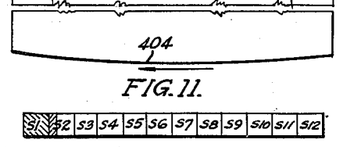
Figure 11 is a graphic view of the light sequence shown in Figure 10.

*Figure 11.*—The Figure 11 shows the graphic scale of sequences, showing three vertical light strips composing sequence S1, as scanned, plus a fourth strip starting the second sequence, S2, also scanned. The foregoing, having described the operation of scanning for the first of twelve, exactly similar sequences, and the starting strip of the second sequence, is deemed by me sufficiently detailed to convey the idea of the conception of the scanning of the entire picture frame.

Figure 12:
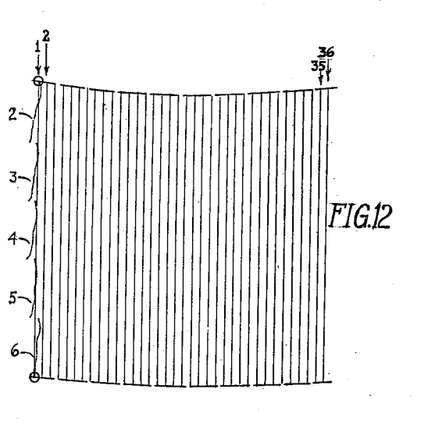
Figure 12 is a plan of the field of view showing the position of certain optical apertures in one of the scanning discs shown in Figure 1.

*Figure 12.*—Figure 12 indicates the same picture frame as in Figure 6, being four times full size, with the thirty six center lines of vertical scanning spaces, and also shows five positions of the curved line of perforations marked 1 on secondary disc of Figure 5, as this curved line of perforations marked 2, 3, 4, 5, and 6 orients itself, during revolution of the pair of discs, in scanning vertical light space center line 1, from top to bottom. Only five of the thirty six orientations resulting from the conjunction of unit holes in the pair of discs are shown on Figure 12, these merely being illustrative of the action. Only the first and last unit holes on the scanned line at the extreme left of the frame are shown on this Figure 12.

Figure 13:
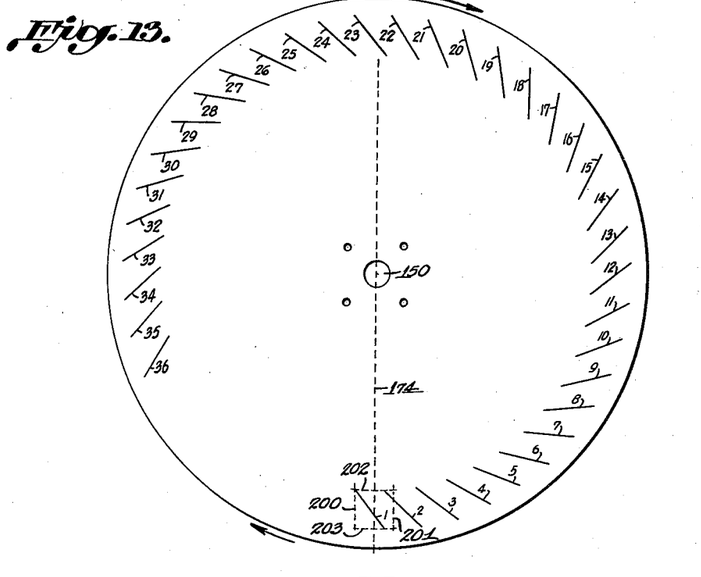
Figure 13 is a plan view of a modified form of scanning disc.
Figure 14:
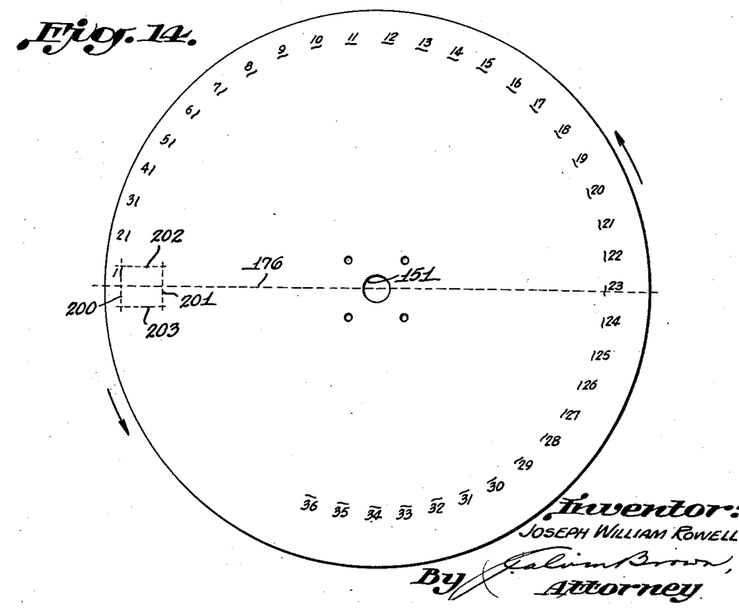
Figure 14 is a plan of a modified form of scanning disc utilized in conjunction with the scanning disc of Figure 13.

*Figure 13.*—In Figure 13 is shown a separate and distinct form of perforation for a primary disc to be used with the secondary disc illustrated in Figure 14, as a pair of the same dimensions and assembly as heretofore described under Figures 1 to 12, inclusive, excepting that in Figure 13, the diagonal lines marked 1 to 36 inclusive, are not a series of lines of punched unit holes as on Figures 1 and 3, but are a series of slits through the disc corresponding in width and length to the respective diameter of circular perforations and the total length of each row of circular perforations, the straight central axis lines being identical in both the unit punching and the slit method. The dotted vertical line 175 passes through center of shaft 150 and through center of the imaginary picture frame enclosed by dotted lines marked 200 to 203, inclusive.

*Figure 14.*—In Figure 14 is shown a separate and distinct form of perforation for a secondary disc, to be used with the primary disc illustrated in Figure 13, as a pair of the same dimensions and assembly as heretofore described under Figures 1 to 12, inclusive, excepting that in Figure 14, the curved lines marked 1 to 36, inclusive, are not a series of lines of punched unit holes, as on Figure 5, but are a series of slits thru the disc, corresponding in width and length to the respective diameters and linear extent of circular perforations, the curved central axis lines being identical in both unit punching and the slit method. It is obvious that either the punched unit perforation system or the slit perforation system, and also the combination of a punched unit primary disc with a slit perforated secondary disc, or vice versa, when mechanically operated as heretofore described, will produce successive modulated electrical frequencies in the cathode plate of a photoelectric cell, since, at the moment of conjunction of two holes of two corresponding rows on a pair of discs will occur at the same instant as the two crossing central axis lines of the holes, which central axis lines are also the central axis lines of the slits of the slitted system, and also it is true that, by the same motion, the center of a punched unit perforation on a primary disc will come in conjunction with the point on the center line of a slit in a slitted secondary disc, at a definite period on its vertical scanning space in the picture frame and at only that point. From these facts it is apparent that, by the use of my invention, unit impulses of light energy may be converted into modulated electrical frequencies for transmission, and conversely, by the same and synchronous scanning of the glow plate of a receiving tube the electrical frequencies manifested thereon by modulated light may be resolved at the receiving point into a reproduction of the image transmitted, the result being accomplished by either of the following four combinations, namely:

First: By the use of a unit punched primary master disc, or its photographic negative replica, as shown on Figures 1 and 3, in combination as a pair with a unit punched secondary master disc, or its photographic negative replica, as shown on Figure 5, for the purpose of scanning in the transmitting apparatus and the simultaneous use of a duplicate pair of discs in the receiving apparatus.

Second: By the use of a slit primary master disc, or its photographic negative replica as shown on Figure 13, in combination as a pair with a slit secondary master disc, or its photographic negative replica, as shown on Figure 14, for the purpose of scanning in the transmitting apparatus, and the simultaneous use of a duplicate pair of discs in the receiving apparatus.

Third: By the use of a unit punched primary disc, or its photographic replica, as shown on Figures 1 and 3, in combination as a pair with a slit secondary master disc, or its photographic negative replica, as shown on Figure 14, for the purpose of scanning in the transmitting apparatus, and the simultaneous use of a duplicate pair of discs in the receiving apparatus.

Fourth: By the use in either of the above three combinations, of a punched primary disc and a slotted secondary disc, forming a pair, or conversely using a slotted primary disc with a punched secondary disc, forming a pair for the purpose of scanning in the transmitting apparatus and the simultaneous use of a duplicate pair of discs in the receiving apparatus. On Figure 14 the dotted horizontal line 176 passes through the center of shaft 151 and through center of the imaginary picture frame enclosed by the dotted lines 200 to 203, inclusive. All of the foregoing specifications constitute a description of my invention as set forth on Figures 1 to 14, inclusive, of the drawings hereunto attached, and in the claims numbered 1 to 4 inclusive, hereinafter made by me, but Figures 15 and 16 illustrate a method of technique devised by me for the purpose of obtaining greater definition in the clarity of the image transmitted and received.

Figure 15:
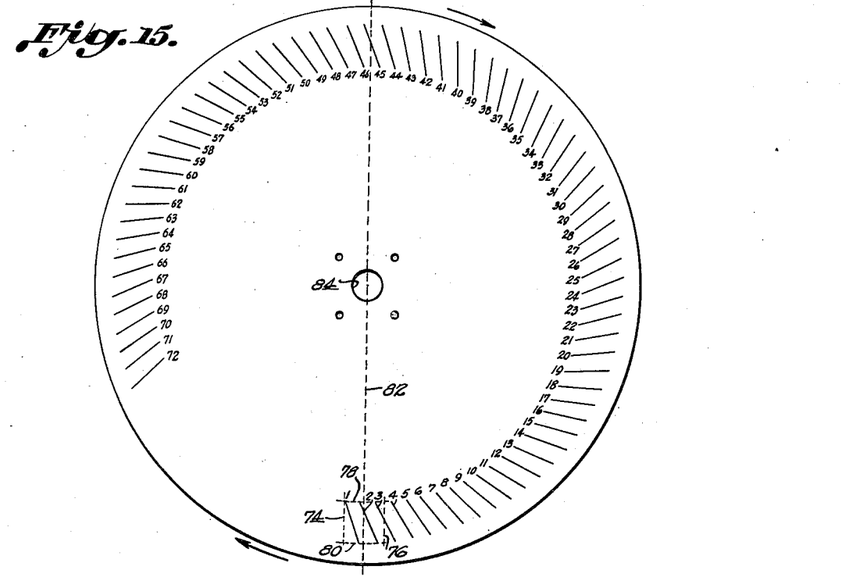
Figure 15 is a plan view of a scanning disc incorporating a large number of optical apertures.

*Figure 15.*—In order to secure twice as fine a definition in the picture it is necessary to prepare the black Radite master discs to a scale twice the diameter to be used in apparatus, with the primary disc divided into twice as many diagonal lines of perforations in the relatively proportioned segment as is depicted on disc 100 of Figure 1, and on Figure 3, with the object in mind of photographically reducing such enlarged discs to the original diameter of nine and seven-eighths inches, after the enlarged primary and secondary discs have been punched and marked while mounted on a jig with shaft centers bearing the relation of twice the dimensions utilized on the transmission and receiving apparatus, and using the same sized hole for punching the primary disc as was used in the disc 100 on Figure 1, namely, one forty eighth inch diameter, and using seventy two holes along each diagonal line.

When photographically reduced one half on to glass plate discs, of one half the diameter of the disc punched, the reproductions of the holes will have one half the diameter of the punched holes or one ninety-sixth of an inch.

In using the scale 125 in Figure 4, as a guide for locating the centers of the scanning spaces when punching thru the primary disc into the secondary disc on the jig, this scale should be divided into twice the number of spaces shown on 125 of Figure 4, or seventy-two spaces. There would be twenty four sequences, each of three lines of light spaces, each light space punched in the staggered order described under the specification of Figures 6, 7, 8, 9, 10 and 11, always remembering that in this case there are twice as many light spaces as shown on Figures 6, 8, and 10.

*Figure 15.*—On Figure 15 is shown to three quarters full size a similarly mounted primary disc as is marked 100 on Figure 1, as photographically reduced to one half diameter of the enlarged punched primary master disc, the diagonal line 1 to 72, inclusive, representing slits 1/96 of an inch wide, their centers having been drawn thru the centers of the seventy two holes of each line of holes on master disc, each such line on the reduced disc indicating a slit 1/96 of an inch wide, which by clockwise revolution of this disc traverses its complementary light scanning line on the picture frame from top to bottom thereof. On this Figure 15, the imaginary picture frame is enclosed by lines 74, 76, 78, and 80, the vertical line passing through the center of the picture frame and the shaft 84, being here marked 82. In the operation of the photographic process of reducing the sizes of the punched or slit perforated master discs, of nineteen and three quarters inches diameter, to one half their diameter, or nine and seven-eighths inches, when reproduced on glass, Celluloid, or any suitable transparent discs, as cited in the foregoing description, it is imperative that the camera be set up rigidly with the central axis of the lens at right angles to the plane of the face of the master primary disc, the latter being firmly secured to a flat immovable transparent backing with evenly distributed light behind it. Having adjusted the camera focus so that the image clearly focused upon the ground glass plate, has a disc diameter of 9 7/8 inches, being one half the similar diameter of the master disc being photographed, an ordinary sensitized plate or film is substituted for the ground glass plate, and the exposure made, and the photographic negative plate removed from the camera, and developed.

From the negative plate thus obtained a positive is printed in the usual photographic manner of printing, and this positive is the actual glass or Celluloid (or any other suitable transparent material) primary disc with opaque field and transparent perforations to be used in the transmitting and receiving apparatus. This positive disc must be already centrally drilled for the shaft, and also for the bolts for securing a metal flange to the disc, and its surface is then sensitized and prepared for receiving the imprint from the negative plate which must be centered accurately on the shaft center of the positive. The above is the photographic process of producing a pair of discs, Figures 15 and 16, of twice the definition of the picture which could be transmitted and reproduced by use of the disc layout shown by Figures 1, 3 and 4. Without changing the position of the camera or background, the secondary punched or slit perforated master disc of nineteen and three-quarters inches diameter is then placed in the exact location on the flat immovable backing and secondary disc is photographed, developed and used as a negative for use in printing the final secondary disc which is to be used in the transmitting and sending apparatus when paired with the primary disc.

Figure 16:
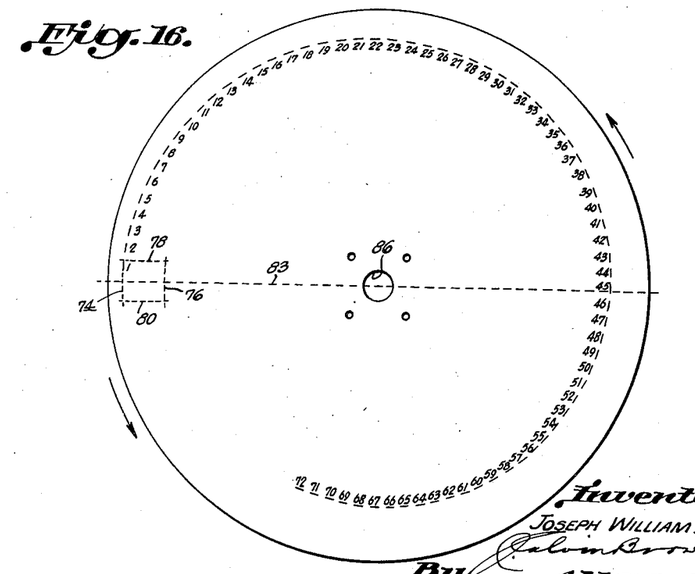
Figure 16 is a plan view of a scanning disc which may be utilized in conjunction with the scanning disc of Figure 15.

*Figure 16.*—In Figure 16 is shown to three-quarters full size, a similarly mounted secondary disc as is marked 38 on Figure 1, as photographically reduced to one half diameter of the secondary master disc, the curved lines 1 to 72 inclusive, representing lines 1/96 of an inch wide drawn thru the centers of the seventy two lines of holes in secondary master disc which were punched thru seventy two lines of holes in primary master disc, Figure 15, each such line indicating a slit 1/96 inch wide, which by anti-clockwise revolution of this disc traverses its complementary light scanning line on the picture frame from top to bottom thereof when revolving. Horizontal dotted line 83 passing thru center line of shaft 86 and thru center line of imaginary picture frame within lines 74, 76, 78 and 80, is same line as is marked 175 on Figure 1.

The above specifications for Figures 15 and 16 are designed to explain a method conceived by me, whereby the definition of the image transmitted and received may be increased to any practical extent by increasing the number of diagonal lines of scanning on primary master disc of proportionately increased diameter, thereafter punching or marking for the perforations in secondary disc thru the unit perforations on primary disc, as same is revolved to bring up the desired point on its diagonal line to its proper position for scanning on a given vertical center line of scanning space, in the manner described under heading of Figures 14 and 15.

Figure 17:
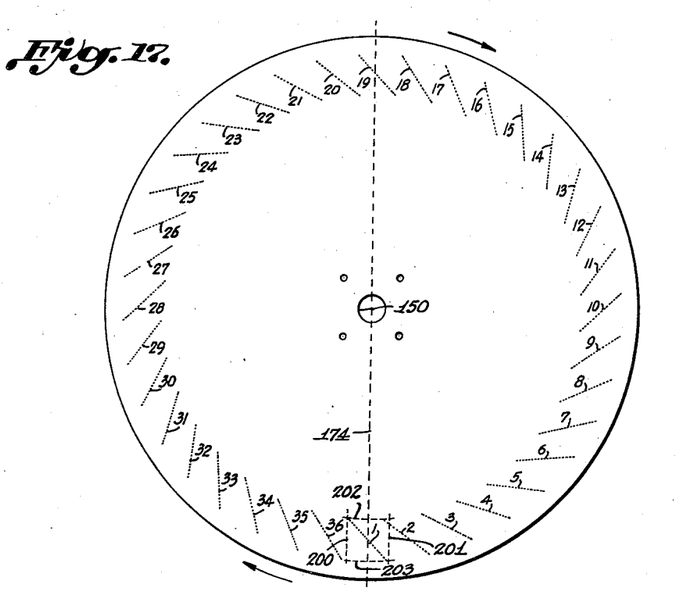
Figure 17 is a further modified plan view of a scanning disc.

*Figure 17.*—In Figure 17, a similarly mounted primary disc as is marked 100 in Figure 1 is shown singly to a scale of three quarters full size, with a vertical center dotted line 174 passing through the center of its shaft 150 and through the center of the imaginary picture frame location which is indicated as enclosed by dotted lines here marked 200 to 203, inclusive. The thirty six diagonal lines of perforations, or transparent spots, marked 1 to 36 inclusive, are spaced evenly around the whole circle and are marked in the order in which the clockwise revolution of the disc causes each diagonal line of perforations or transparent spots to traverse its complementary vertical light scanning strip on the imaginary stationary picture frame area within the lines 200 to 203, inclusive.

Figure 18:
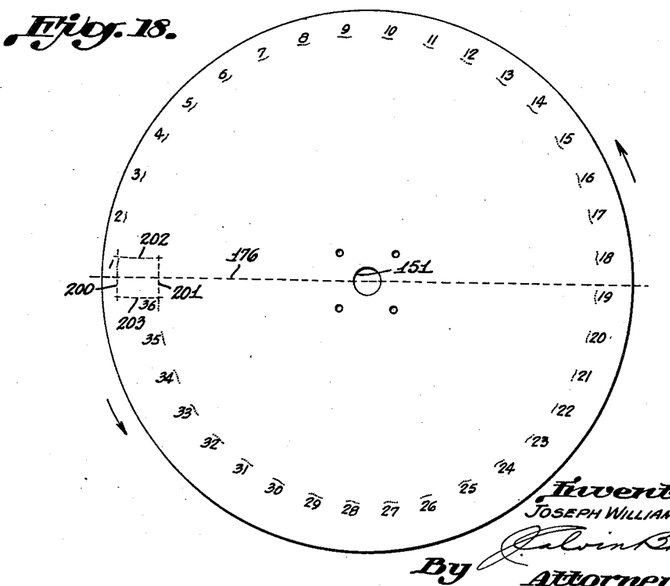
Figure 18 is a plan view of a scanning disc which may be utilized in conjunction with the scanning disc of Figure 17.
Figure 19:
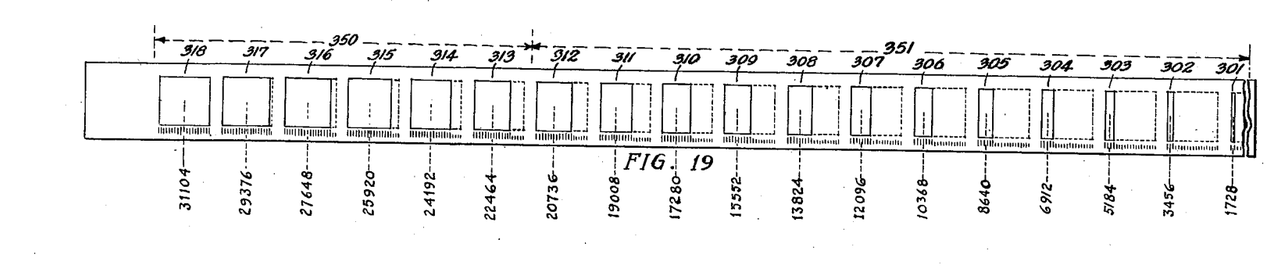
Figure 19 is a plan view of a series of shutter apertures which may be utilized in the practice of the invention.

This primary disc shown in Figure 17 is designed to be used as a pair with the secondary disc shown in Figure 18 on same motivating apparatus, as heretofore mentioned in the operation of pairs of discs previously described under headings Figures 1 to 16, inclusive, but they are differently perforated from those previously described discs and are designed to be used for a different purpose, namely, that of imposing upon an electric current pulsations or ripples of even characteristics, but separated in groups which can be precontrolled in their time periods at the transmitting apparatus by use of shutter openings, Figure 19, of various areas, each such area being a fractional part of the entire imaginary frame area, which is in this case three quarters inch square.

*Figure 18.*—This figure shows a secondary disc to be used as a pair with disc shown on Figure 17, and Figure 18 is a similarly mounted disc as is marked 101 on Figure 1, and is shown singly to a scale of three quarters full size, with a horizontal center dotted line 176 passing through the center of its shaft 151 and through the center of the imaginary picture frame location which is enclosed by dotted lines here marked 200 to 203, inclusive.

The thirty six lines of perforations marked 1 to 36, inclusive, on the secondary disc shown on Figure 18, are complementary to the thirty six similarly marked diagonal lines on the primary disc shown on Figure 17, and this secondary disc was perforated on the same jig as used to perforate the secondary disc shown in Figure 5, by using the unit perforations on primary disc shown on Figure 17 as a guide for punching through, but in this case the diagonal lines of Figure 17 are used as guides in a consecutive order instead of in a staggered order when aligning the unit perforations on their proper vertical scanning lines. The activating light beam in the case of these discs, Figures 17 and 18, which are not for television purposes, but are for the purpose of accomplishing remote control, does not scan through an intermittently moving photo-film on to the photo-electric cell, nor does it reflect from the viewed object on to the said cell, but it passes directly from the conjuncted holes of the disc pair on to the cathode of the photo-electric cell.

Thus, with the discs revolving at the rate of twenty four revolutions per second, and using a shutter opening of same dimensions as the imaginary frame, ¾ inch square, a continuous and even stream of frequencies totaling 36 times 36 times 24 or 31,104 frequencies per second, is imposed upon the electric current. Likewise, if the activating light area be reduced to a fractional part of the ¾ inch square maximum area, as by means of a shutter with lesser imaginary frame area, then the number of frequencies generated will be of the same relation to a maximum of 31,104 as the proportional area of shutter aperture bears to the maximum imaginary frame area.

*Figure 19.*—In Figure 19 is illustrated a scale of shutter apertures of eighteen fractional areas enclosed by rectangular solid lines and numbered 301 to 318 for admitting eighteen different degrees of activating light control to the cathode of the photo-electric cell, after passing through the conjuncted perforations or transparent spots of the pair of discs, Figures 17 and 18, it being assumed that eighteen different degrees of control on distant magnetic switches are desired and the scale may be considered as composed of two separate scales of lengths 350 and 351, and each scale division space, below each aperture represents two vertical light scanning spaces. The following table shows the assumed purposes of each control. Scale 350 includes six varying areas, 313 to 318, inclusive, for the following speed controls at a distance:

| Area number | |
|---|---|
| 313 | controls one eighth speed astern |
| 314 | controls one half speed astern |
| 315 | controls full speed astern |
| 316 | controls one eighth speed ahead |
| 317 | controls one half speed ahead |
| 318 | full speed ahead |

Scale 351 includes twelve varying areas, 301 to 312, inclusive, for the following steering controls of rudder at a distance.

| Area number | | Rudder position |
|---|---|---|
| 301 | controls 15 degrees | |
| 302 | controls 30 degrees | to right |
| 303 | controls 45 degrees | |
| 304 | controls 15 degrees | |
| 305 | controls 30 degrees | to left |
| 306 | controls 45 degrees | |
| 307 | controls 15 degrees | |
| 308 | controls 30 degrees | vertically up |
| 309 | controls 45 degrees | |
| 310 | controls 15 degrees | |
| 311 | controls 30 degrees | vertically down |
| 312 | controls 45 degrees | |

The number of frequencies generated per second by each of the eighteen fractional areas shown are indicated as from 1,728 to 31,104, as marked below each such area on the scale, Figure 19.

The above hypothetical use of the frequencies generated by the mechanical combination of Figures 17, 18 and 19 is only given as an illustration of one way in which said combination may be used for remote control over wired or radio circuits, but any desired number of selective controls may be attained by perforating the scale shutter, Figure 19, in the number of proportional fractional areas of the imaginary scanning frame as desired.

Figure 20:
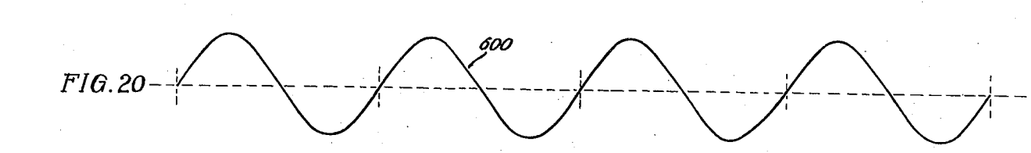
Figure 20 is a sine curve for the purpose of illustrating certain features of the invention.

*Figure 20.*—The sine curved marked 600 on Figure 20 illustrates the sine curve characteristics of uninterrupted, hence continuous frequencies which would be imposed on an electric current by using aperture 318 of Figure 19 which would permit generation of 36 times 36 or 1296 frequencies for each revolution of the discs, Figures 17 and 18, when mounted and revolved as heretofore described. As each revolution occurs in one twenty-fourth of a second, the number of frequencies generated per second would be 1,296 times 24 or 31,104, as marked below aperture 318 on Figure 19, and this is the maximum number of frequencies which may be generated by discs perforated as in Figures 17 and 18, with the primary disc perforated by thirty six diagonal lines of unit holes or transparent spots, each such line being equally spaced around the disc circle.

Figure 21:
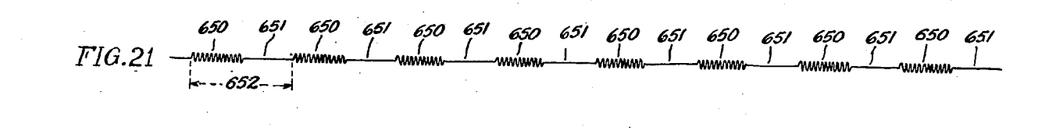
Figure 21 is a graphic illustration of relative frequencies and time periods in the practice of certain embodiments of the invention, and, Figure 22 is a curve illustrative of the time period during which a frequency is generated for television purposes.

*Figure 21.*—It is obvious that by substituting for aperture 318 of Figure 20, the aperture marked 309 on same figure, which has one half the area of aperture 318, there will result the generation of one half of 31,104 frequencies or 15,552 frequencies in one half second and that during the following one half second no frequencies will be generated; therefore, Figure 21 will serve to graphically illustrate the relation of the groups of 15,552 frequencies per one-half second to the other one-half second time period in which no frequencies are imposed on the electric current.

In Figure 21, the figures 650 indicate the recurrence of groups of 15,552 frequencies per second, while the figures 651 indicate the recurrence of time periods during which no frequencies are generated, and figure 652 indicates a time period of one eight hundred and sixty fourths ($\frac{1}{864}$) part of a second.

Figure 22:
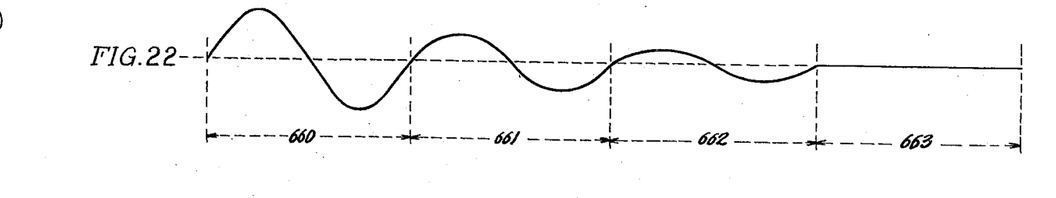

*Figure 22.*—The sine curve diagram marked Figure 22 does not illustrate frequencies of constant peak intensity such as are generated for purposes of remote control described under Figures 17, 18 and 19, but does illustrate the sine curve characteristics of frequencies of varying peak intensities, known in television as modulated frequencies, and it is the latter that have been considered under headings of Figures 1 to 16, inclusive.

In Figure 22, the figure 660 represents the time period during which a frequency is generated for television purposes, by an activating light beam passing through the most transparent unit spot on a photo-film on to the cathode plate of a photo-electric cell, or as an alternative, by an activating light beam reflected from the lightest unit spot on a subject scanned this spot being one of those having maximum reflective properties of all unit spots on the directly scanned subject, and the sine curve shown in the length marked 660 represents a frequency with maximum peak intensity. In like manner the sine curve shown in the length marked 661 represents a modulated frequency having one half maximum peak intensity, and the sine curve shown in the length marked 662 represents a modulated frequency having one fourth maximum peak intensity and the length marked 663 represents a time period during which no frequencies are produced by the activating light beam, due to its failure to pass through a densely opaque unit spot on the photo-film or, as in an alternative use, due to the blackness and low reflective properties of the unit spot directly scanned.

For the reasons above explained the characteristics of the modulated frequencies are entirely different from those constant frequencies of varying group lengths and are used for different purposes as heretofore set forth.

I am aware that prior to my invention, mechanical scanning for the purpose of generating electric frequencies from light impacts on the sensitive cathode plate of a photo-electric cell has been done by a spirally perforated single revolving disc, as well as by use of a helically perforated drum, and that by the use of the duplicate of said single disc or drum at the receiving end of a wired or radio circuit, a somewhat defective image of the original object has been received.

I therefore do not claim the method of mechanical disc scanning broadly, but I do claim an improvement in the process of mechanical light scanning for the purpose of generating electrical frequencies from instantaneous unit impacts of a light beam from a light source of constant intensity upon the cathode plate of a photo-electric cell, these impacts coming through a momentarily fixed point on the scanned surface through the similar momentary conjunction of a pair of unit perforations in a pair of revolving discs. I am also aware that practically similar results may be attained by forming a series of perforated slits in the primary and secondary discs and causing them to revolve in the complementary manner heretofore described, the slit perforations corresponding in width and length of each row of said perforations in each of the pair of discs, and the center lines of the slit perforations being identical with the center lines of the corresponding rows of punched perforations heretofore described.

I am also aware that, if the activating light be located at the rear of the double discs, so that the unit light beams are made to act in a reverse direction to that resulting from locating the activating light on the side of the discs from which they are viewed in the drawings herewith, while retaining the same directions of revolution indicated thereon, then the picture frame area will be scanned in successive lines from right to left instead of from left to right as shown, and it is therefore optional in designing an apparatus for utilizing the scanning discs, to scan through the discs in either of the two directions.

I claim:

1. In combination, first and second scanning discs in overlapped relationship, means for rotating said discs simultaneously in opposite directions, a plurality of spaced light transmitting line areas for both discs, said line areas adapted to progressively intersect during rotation of the discs, means for focusing a beam of light through said intersecting line areas and so related that the surface of a picture being scanned has light beams projected thereon in vertical and substantially parallel contiguous strip areas to progressively cover the entire surface of the picture.

2. In combination, a pair of scanning discs in overlapped relationship, one of said discs provided with light transmitting line areas and the other of said discs provided with light transmitting line areas differently related to the line areas of the other disc, said line areas made up of a plurality of minute openings and adapted to intersect, means for effecting simultaneous opposite rotation between said discs, and said line areas progressively intersecting during rotation of the discs to effect passage of a light beam therethrough in processional substantially parallel light lines.

3. A device for scanning a picture progressively with a plurality of parallel rays of light, including a pair of scanning discs, one disc provided with spaced angular light transmitting line areas and the other disc provided with spaced light transmitting line areas differently arranged from the line areas of the first disc, means for mounting said discs in overlapped relationship and for opposite rotation to position a line area of one disc in intersecting relationship to a line area of the other disc, said line areas being so related that during rotation of the discs, a beam of light focused on said line areas has an emergent beam scanning the picture area in staggered successive transverse parallel lines and progressively from one side of the picture to the other.

4. In combination, first and second scanning discs in overlapped relationship, means for rotating said discs simultaneously in opposite directions, a plurality of fixed spaced light transmitting line areas for both discs, said line areas adapted to progressively intersect during rotation of the discs, means for directing a beam of light through said intersecting line areas and so related that a surface being scanned has light beams projected thereon in straight line and substantially parallel contiguous strip areas to progressively cover the entire area of said surface.

JOSEPH WILLIAM ROWELL.